T. F. RATAICZAK.
AUTOMATIC RELEASE.
APPLICATION FILED JULY 18, 1919.

1,406,491.

Patented Feb. 14, 1922.

Inventor:
Thomas F. Rataiczak
By
Attorneys.

UNITED STATES PATENT OFFICE.

THOMAS F. RATAICZAK, OF TROY, OHIO, ASSIGNOR TO THE HOBART MANUFACTURING COMPANY, OF TROY, OHIO, A CORPORATION OF OHIO.

AUTOMATIC RELEASE.

1,406,491.   Specification of Letters Patent.   Patented Feb. 14, 1922.

Application filed July 18, 1919. Serial No. 311,813.

*To all whom it may concern:*

Be it known that I, THOMAS F. RATAICZAK, a citizen of the United States, and a resident of Troy, in the county of Miami and State of Ohio, have invented certain new and useful Improvements in Automatic Releases, of which the following is a full, clear, and exact description, reference being had to the accompanying drawings, forming part of this specification.

My invention relates to automatic releases for use chiefly in connection with food reduction mills, such as coffee grinders, meat choppers and the like, and is of special value in connection with high speed choppers and grinders.

In devices of the above character, the result of some hard substance falling in between the grinding surfaces, or in some other way stopping the operation of the working surfaces, is to at once put a breaking strain on the driving elements, resulting in burning out the motors, stripping gears and the like. For this reason there have been devices inserted somewhere in the driving mechanism of such machines, to permit a disconnecting of the power when a stoppage occurs.

In the past, so far as I am aware, these devices have not been fully efficient, particularly in high speed machines, because there is not sufficient free play given to the driving parts at the point of disconnection from the operating mechanism.

It is the object of my invention to provide a release of the type noted which when put into action will not only disconnect the grinding or chopping plates from the source of power, but will permit the very loose or "sloppy" running of the drifting parts at the point of disconnection. It is a further object to so construct my device as to permit free longitudinal as well as rotary play between the disconnected parts so that, among other things, the grinding disks may spread apart, thereby permitting the interfering hard substance to drop down between them and out of the way.

It is my general object to provide a simple and practical way of releasing automatically a driving and an operating part, and I accomplish my various objects by that certain construction and arrangement of parts to be hereinafter more specifically pointed out and claimed.

Figure 1:
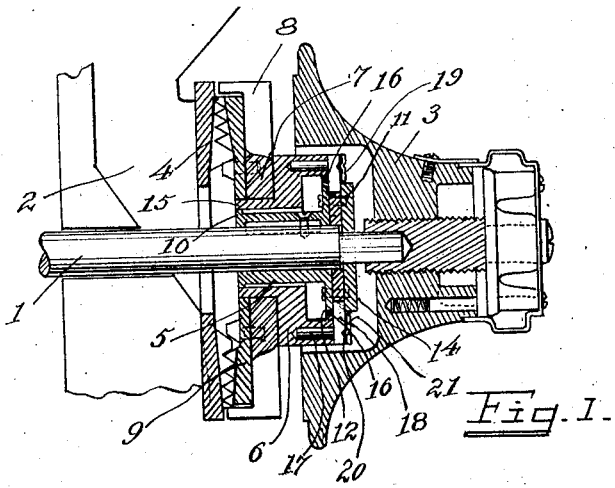
Figure 1 is a cross section through the release and the grinding disks of a coffee grinder, this form of machine being selected for illustrative purposes.

As shown in the drawings, 1 is the driving shaft of the device, 2 the conduit through which the material to be ground falls to the grinding disks, and 3 is the terminal member of the coffee grinder casing. In the mouth of the coffee conduit is the fixed annular grinding disk 4, having concentric rows of teeth, and through the center of which disk the coffee passes to be reduced.

The shaft 1 is keyed to the sleeve 5, which is the inner member of the release, and the sleeve 5 seats or is journaled in the collar 6. Devices on the collar 6 engage the sleeve, and these devices together with the special form of seat or journal between the collar and the sleeve form the essential features of this invention. The collar has mounted thereon the plate 7, having arms 8, and to the arms is screwed the grinding plate 9, which is the movable plate of the coffee grinder. When mounted and in normal running order, the grinder plate 9 will be held in mesh with the fixed grinder plate hitherto mentioned, and among other things the special release device is calculated to permit the collar and grinder plate to move axially on the sleeve 5, whereby it will move out of mesh with the fixed plate.

The conformation of the inner member of the release, to wit: the sleeve 5 comprises the main portion, which is tubular, the inner end of which is widened and machined to form a narrow bearing or seat 10, and the outer end of which is formed with a like seat and sockets for the driving dogs.

Thus there is formed at the outer end a flange 11 of considerable width, which has at its inner edge a narrow seating or bearing ridge 12. The outer face of the flange is formed with a pair of oppositely located notches 13, and a plate 14 is mounted over the said outer face having the same conformation as the main body of the flange, and thus serving as a convenient means of making sockets of the notches 13.

The collar 6 is formed interiorly so as to loosely receive the sleeve and the flange 11 thereon. At the inner and outer end, however, the narrow seats 15 and 16 are formed, to match the ridges 10 and 12 of the sleeve. In the outer face of the collar are suitable holes for swivelly receiving the posts 17 of dogs 18, which are located so that they can simultaneously engage in the two sockets formed in the sleeve flange.

Figure 2:
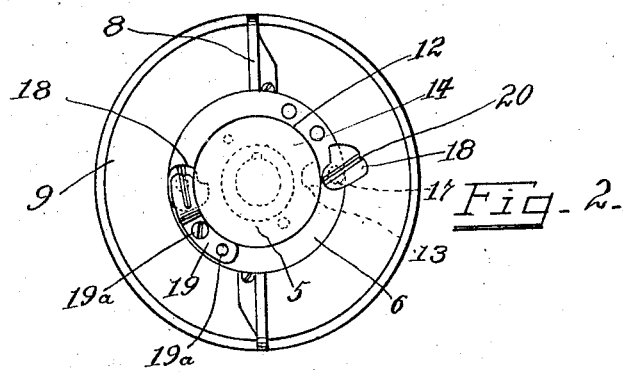
Figure 2 is an end elevation of the release, showing one of the dogs in released position, although this would not occur in actual operation since both would release at the same time.
Figure 3:
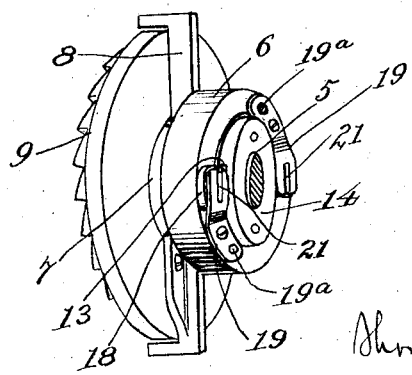
Figure 3 is a perspective view of the device, disassociated from the balance of the machine.

As shown in Figure 2, when the dogs are in place they engage in the sockets, but upon a stoppage of the grinding disk, they will be forced out of engaging position due to their conformation. Not only do the dogs retain the collar and sleeve nonrotatably together, but they also hold them from movement axially, so that in the construction shown they prevent the collar from sliding off of the ridged seats described, thereby moving away from the fixed grinding disk, and permitting a loose free motion of the sleeve.

In order to exert spring pressure against the dogs to hold them in place, I prefer to employ flat springs 19, which are secured by means of a pair of screws 19$^a$ to the face of the collar and engage over the dogs. The dogs have slots 20 cut across them, and depending ridges 21 on the springs engage in the slots and hold the dogs in position. When sufficient strain is placed on the parts, however, the dogs will be forced out of engaging position in spite of the springs, and will remain out of position until the machine is stopped and they are forced back into the sockets.

The location of the springs and their conformation is such that they extend along their inner edge slightly over the opening in the collar, and thereby serve as abutments against which the seating ridge 12 of the sleeve will strike should the release tend to throw the collar inwardly.

The adjustment of the springs on the face of the collar can be regulated by the use of shims placed under said springs prior to screwing them down, and thus the resistance of the dogs to displacement can be adjusted.

It can be readily observed that upon a forced release of the parts, the dogs will permit the collar to move axially of the sleeve, which it will always do in the instance of an obstruction to the disks. This movement will at once leave the sleeve very loose in the collar, so that even at very high speed, there will be little or no resistance to the free relative movement of the sleeve and collar, and so that any obstruction between the grinding disks can readily fall out or be dislodged by the operator.

While I have described my invention in detail with reference to a coffee grinder and have made no particular point during the course of the description to the substitution of other mechanical equivalents for the parts shown and described, it should not be understood that I intend to limit my invention to such details. On the contrary, I consider the invention as applicable to a wide range of machinery, and desire that my claims that follow be construed with the full use of the doctrine of equivalents.

Having thus described my invention, what I claim as new and desire to secure by Letters Patent, is:

1. In a safety release, the combination of a driving member, a driven member concentric therewith, a yielding driving connection between said driving and driven member, and said two members being provided with means whereby the yielding of the driving connection imparts axial freedom of movement between said members and also relative looseness.

2. In a safety release, the combination of a driving member, a driven member concentric therewith, a yielding driving connection between said members, said two members provided with a short bearing intermediate the two whereby the yielding of the driving connection establishes a very loose relation between the two members.

3. In a safety release, the combination of a driving member, a driven member concentric therewith, and a yielding driving connection between said members, adapted to hold them together radially and axially, said members being so arranged that freedom of axial movement will permit the one member to move to a position very loosely engaging the other member.

4. In a safety release, the combination of a driving member, a driven member concentric therewith, and a yielding driving connection between said members, adapted to hold them together radially and axially, said two members fitting together very loosely except for restricted lines of engagement, whereby axial movement permits the relative movement of said members out of engagement on said restricted lines.

5. In a safety release, the combination with an internal and an external member concentric with each other, one driving and the other driven thereby, said outer member being shaped to very loosely fit over the inner member, narrow seats between said members to hold them against looseness except upon axial movement, and a yielding connection between them and adapted to hold them against both relative axial and rotary movement.

6. In a safety release, the combination of an internal and an external member, a chamber in said external member, said internal member being formed of less diameter than said chamber, ridges on the internal member and the external member to seat against each other in said chamber, and yielding means for holding said members against relative rotary and axial movement, said means forming a driving connection between said inner and outer members.

7. In a safety release, the combination of a driving member and a driven member concentric therewith adapted in one position to engage each other snugly, and in another relative position to engage each other loosely, said members being both axially and rotatably movable with relation to each other, and a yielding means on one of the members engaging in a socket in the other member to form a driving connection between said members, for the purpose described.

8. The combination with a driving member and a driven member concentric therewith, said members provided with a short longitudinal bearing, with means for shifting longitudinally the one member with reference to the other whereby said members when shifted will move into very loose engagement with each other.

THOMAS F. RATAICZAK.